United States Patent [19]
Inoue et al.

[11] Patent Number: 4,765,691
[45] Date of Patent: Aug. 23, 1988

[54] WHEEL SLIP CONTROL SYSTEM

[75] Inventors: Yoshiaki Inoue, Toyota; Akira Shirai, Toyoake; Yoshihisa Nomura, Toyota; Kazumasa Nakamura, Okazaki; Takafumi Inagaki, Toyota; Harumasa Minegishi; Kiyotaka Ise, both of Susono, all of Japan

[73] Assignee: Toyota Jidosha Kabushiki Kaisha, Toyota, Japan

[21] Appl. No.: 5,778

[22] Filed: Jan. 21, 1987

[30] Foreign Application Priority Data

Jan. 21, 1986 [JP] Japan .................................. 61-10864

[51] Int. Cl.⁴ ............................ B60T 8/48; B60T 8/36
[52] U.S. Cl. ...................................... 303/117; 303/119; 180/197
[58] Field of Search ..................... 180/197; 303/10, 96, 303/100, 105, 110, 111, 113, 114, 115, 116, 119, 98, 117

[56] References Cited

U.S. PATENT DOCUMENTS

| | | | |
|---|---|---|---|
| 3,893,535 | 7/1975 | Burckhardt et al. | 303/96 |
| 4,175,794 | 11/1979 | Pauwels | 303/105 |
| 4,509,802 | 4/1985 | Solleder et al. | 303/110 |

FOREIGN PATENT DOCUMENTS

3119803 12/1982 Fed. Rep. of Germany .
2162264 1/1986 United Kingdom .

OTHER PUBLICATIONS

Patent Abstracts of Japan, vol. 9, No. 213 (M-408), [1936], 30th Aug. 1985; & JP-A-60 71 360 (Toyota Jidosha K. K.), 23-04-1985.

*Primary Examiner*—Andres Kashnikow
*Assistant Examiner*—Timothy Newholm
*Attorney, Agent, or Firm*—Oblon, Fisher, Spivak, McClelland & Maier

[57] ABSTRACT

A wheel slip control system for independently executing an anti-skid control and a traction control. The system includes a microcomputer, a first capacity control valve for anti-skid control, a selector valve, and a second capacity control valve for traction control. These values are connected in series between a master cylinder and a break cylinder. Such valves prevent brake fluid from over-charging a reservoir even in the course of switching from anti-skid control to traction control or vice versa, so that the brake pressure is properly reduced without consideration of capacity of the reservoir.

5 Claims, 6 Drawing Sheets

FIG. 4A WHEEL ROTATIONAL SPEED

FIG. 4B DRIVING WHEEL ACCELERATION

FIG. 4J 3-POSITION SOLENOID VALVE
c BUILD-UP PRESSURE
b HOLD PRESSURE
a REDUCE PRESSURE

FIG. 4K PEDAL SWITCH

FIG. 4L HYDRAULIC SWITCH

FIG. 4M 2-POSITION SELECTOR VALVE

WHEEL SLIP CONTROL SYSTEM

BACKGROUND OF THE INVENTION

Field of the Invention

The present invention relates to a wheel slip control system, and more particularly, to a system for executing both anti-skid control and traction control which prevent wheel slip due to braking and accelerating during starting a vehicle, respectively.

Discussion of Background

Various types of wheel slip control system employing a combination of the above control systems have been introduced. For example, published Japan Patent Application No. sho 58-16947 discloses a wheel slip control system of the above type, which, however employs only a three-position solenoid valve through which the anti-skid and the traction controls are executed. In order to reduce brake pressures during anti-skid controlling, brake fluid of a wheel cylinder is drawn into a reservoir via the solenoid valve. Since the capacity of the reservoir is limited in consideration of its fail-safe structure, in the course of switching from anti-skid control to traction control, or vice versa, the amount of the fluid which is charged to the reservoir might exceed the capacity thereof. Such overcharging of the brake fluid will hinder the wheel slip control system from establishing an optimum pressure reduction.

SUMMARY OF THE INVENTION

An object of the invention, therefore, is to provide a wheel slip control system including an anti-skid control system and a traction control system which function independently of each other.

Another object of the invention is to provide individual capacity control valves for the anti-skid control system and the traction control system, thereby establishing an optimum pressure reduction without regard to the capacity of the reservoir.

These and other objects are achieved according to the invention by providing a new and improved wheel slip control system including hydraulic braking means including a series connection of first capacity control valve for an anti-skid control, a selector valve, and a second capacity control valve for a traction control connected in series between a master cylinder and a wheel cylinder, hydraulic pressure source means for generating hydraulic pressure to operate the first and second capacity control valves, first solenoid valve means provided between the hydraulic pressure source means and an input port of the first capacitor control valve, a second solenoid valve means provided between the hydraulic pressure source means and an input port of the second capacity control valve, and electronic control means for controlling the first and second solenoid valve means and for generating an electronic control signal indicative of switching the selector valve to a cut position upon sensing of a start of a traction control, thereby preventing interference between the traction control and said anti-skid control. The wheel slip control system according to the present invention thus achieves optimum anti-skid and traction controls via the respective control valves thereof. Accordingly, the system with the above individual valves prevents the brake fluid from over-charging to the reservoir, resulting in proper pressure reduction.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein:

FIGS. 4A through 4M are correlated timing charts representing changes in the respective data:

DESCRIPTION OF THE PREFERRED EMBODIMENTS

Figure 1:
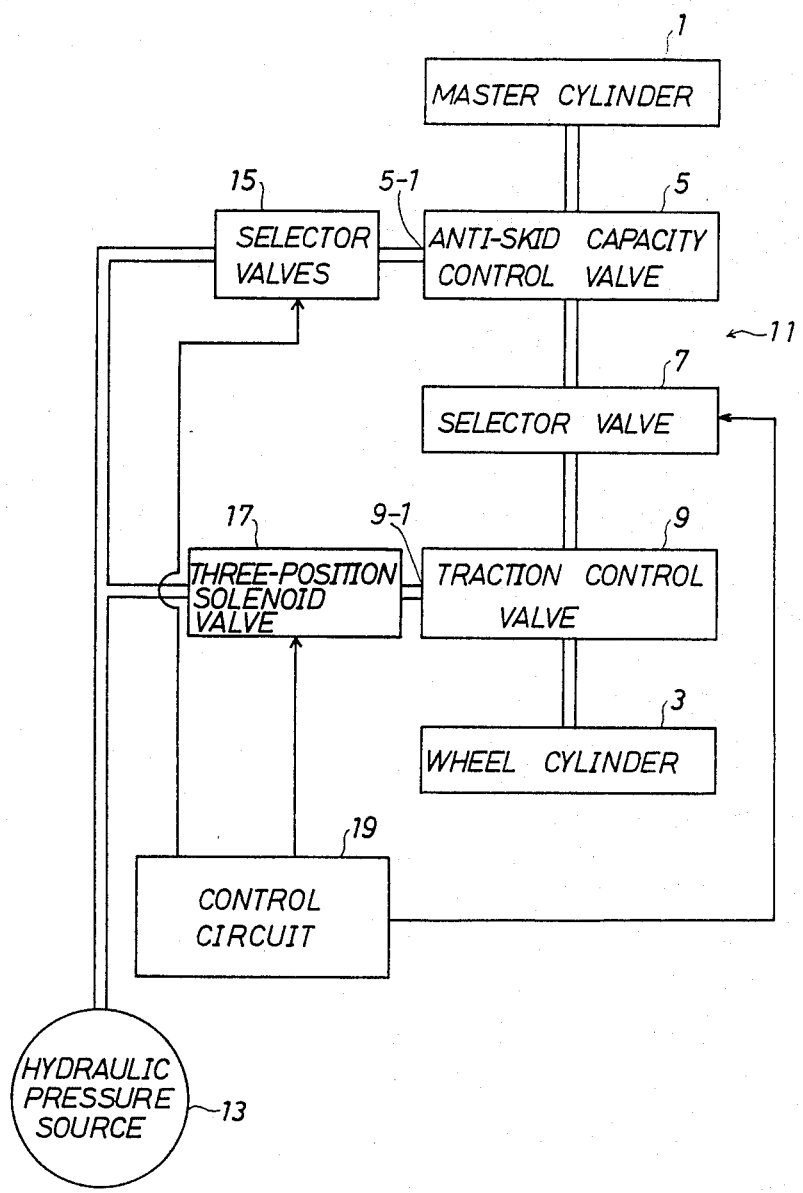
FIG. 1 is a schematic block diagram of a basic structure embodying the present invention.
Figure 2:
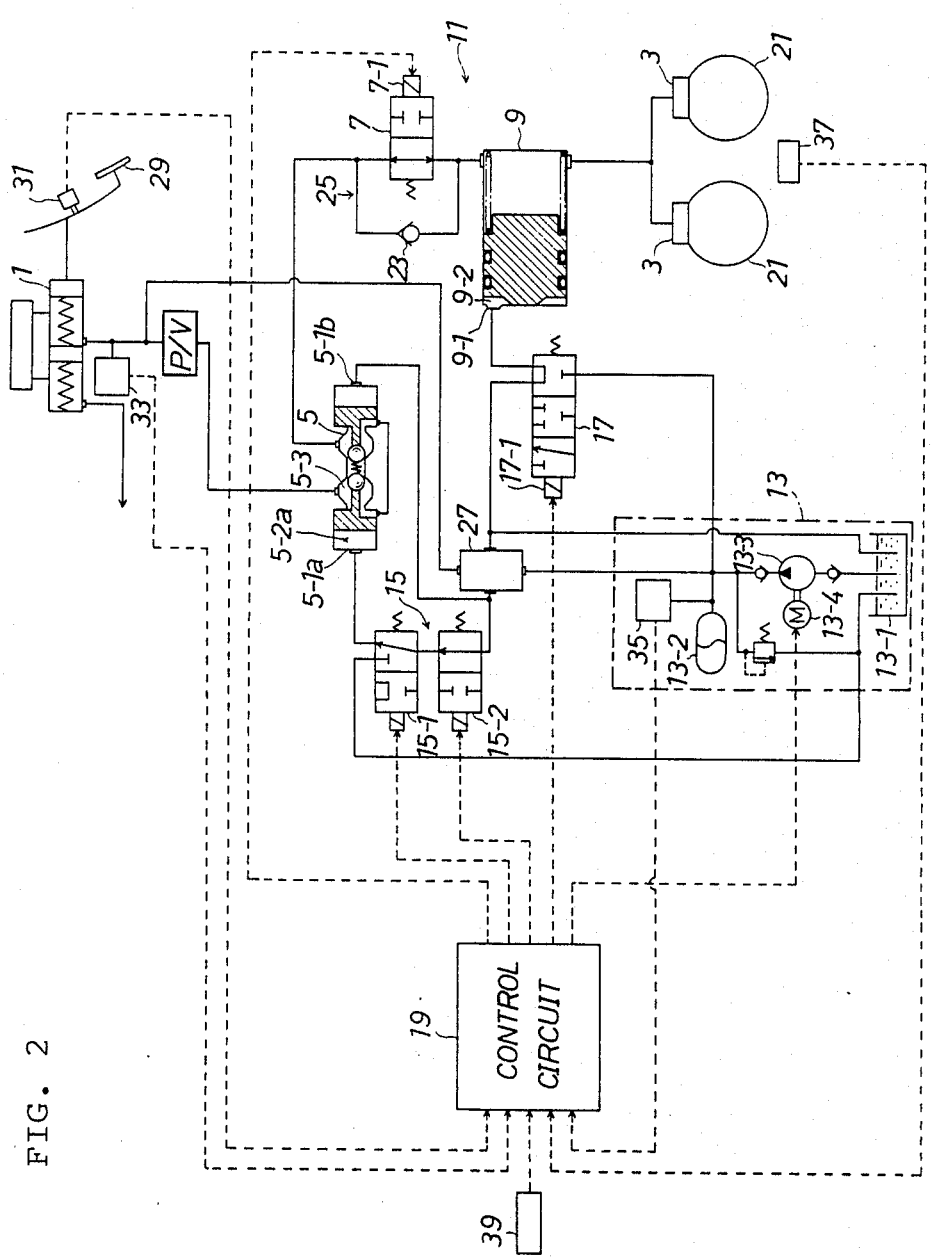
FIG. 2 is a functional block diagram illustrating a wheel slip control system of a first preferred embodiment according to the invention.

Referring now to the drawings, wherein like reference numerals designate identical or corresponding parts throughout the several views, and more particularly to FIGS. 1 and 2 thereof, in a brake hydraulic pressure circuit 11 provided between a master cylinder 1 and wheel cylinders 3 of driving wheels 21, a capacity control valve 5 for an anti-skid control system, a circuit 25 provided between a two-position selector valve 7 and a check valve 23, and a capacity control valve 9 for a traction control system are connected in series.

Figure 6:
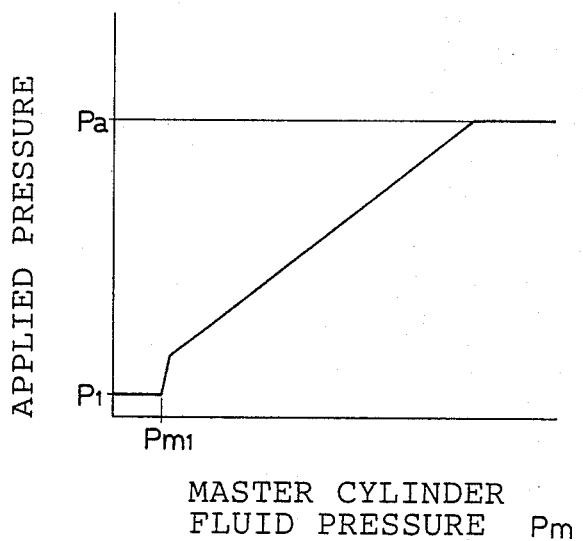
FIG. 6 is a graph defining the characteristic of a hydraulic pressure regulator.

In the anti-skid control mode, an energized current from an electronic control circuit 19 is not fed to the two-position selector valve 7 so that the valve 7 is kept at a position where the valve 5 for the anti-skid control is communicated with the reservoir of the valve 9 for the traction control. The valve 9 is kept at a position where an input port 9-1 is communicated with a reservoir 13-1 of a hydraulic pressure source 13. A position at the first two-position solenoid valve 15-1 is communicated with one of input ports 5-1 of the valve 5, i.e., 5-1a, and combined in series with a position at the second two-position solenoid valve 15-2, thereby producing the following possible operations:

(1) The first input port 5-1a is communicated with a mechanism for adjusting the brake pressure which is generated by the hydraulic pressure source 13 in response to an operating degree of the accelerator, for example, a hydraulic pressure regulator 27, as shown in FIG. 2 (the characteristic of the regulator 27 is featured in the graph of FIG. 6), or (2) the first input port 5-1a is communicated with the reservoir 13-1, or (3) the first input port 5-1a is shut off from the hydraulic pressure regulator 27 and the reservoir 13-1, respectively.

Another input port, i.e., the second input port 5-1b, is constantly kept in a position to be communicated with an output port of the hydraulic pressure regulator 27. According to the above operations, the hydraulic pressure within a first brake fluid chamber 5-2a including the first input port 5-1a is adjusted to be built-up, reduced, or held. The capacity of a hydraulic pressure chamber 5-3 in the valve 5 is changed in correlation with the adjusted hydraulic pressure in the brake fluid chamber 5-2a, thereby enabling the brake fluid to be held, fed to, or drained from the wheel cylinders 3. Two solenoid valves 15-1 and 15-2 of the first solenoid selector valve 15 are controlled by means of the electronic control circuit 19.

In the traction control mode, the two-position selector valve 7 is constantly supplied with the energized current from the electronic control circuit 19 to maintain the control valve 5 fluidically isolated from the valve 9. Accordingly, the selector valve 7, together with a check valve 23, functions to prevent changes in the brake fluid pressure from influencing the capacity of the master cylinder. The control valve 5 allows the master cylinder 1, the two-position selector valve 7, and the check valve 23 to be communicated with each other, since the solenoid valves 15-1 and 15-2 are constantly kept in positions as shown in FIG. 2. Adjusting the three-position solenoid valve 17 by means of the electronic control circuit 19 provides the following pattern for controlling the pressure within the fluid chamber 9-2 including an input port 9-1:

(1) the input port 9-1 is communicated with the hydraulic pressure source 13, or (2) the input port 9-1 is communicated with the reservoir 13-1, or (3) the input port 9-1 is shut off from an accumulator 13-2 in the hydraulic pressure source 13 and the reservoir 13-2, respectively.

With the above operations, the pressure within the chamber 9-2 is controlled to be either built-up, reduced, or held, so that the brake fluid is held, fed to, or drained from the wheel cylinders 3, thereby adjusting the position of the spool of the valve 9, and so adjusting the pressure within the reservoir of the valve 9.

The electronic control circuit 19 receives respective signals from a pedal switch 31 indicating an ON/OFF state in response to depressing/releasing of the brake pedal 29, a hydraulic pressure switch 33 indicating an ON/OFF state in accordance with the hydraulic pressure of the master cylinder 1, another hydraulic pressure switch 35 indicating ON/OFF state in accordance with the hydraulic pressure of the accumulator 13-2, a driving wheel speed sensor 37 for generating a signal in response to the respective rotational speed of driving wheels 21, and an idler wheel speed sensor 39 for generating a signal in response to the rotational speed of the idler wheel. Then, the circuit 19 transmits the above signals to the selector valve 7, solenoid valves 15-1 and 15-2, the three-position solenoid valve 17, and a motor 13-4 which drives a pump 13-3 in the hydraulic pressure source 13.

Figure 3:
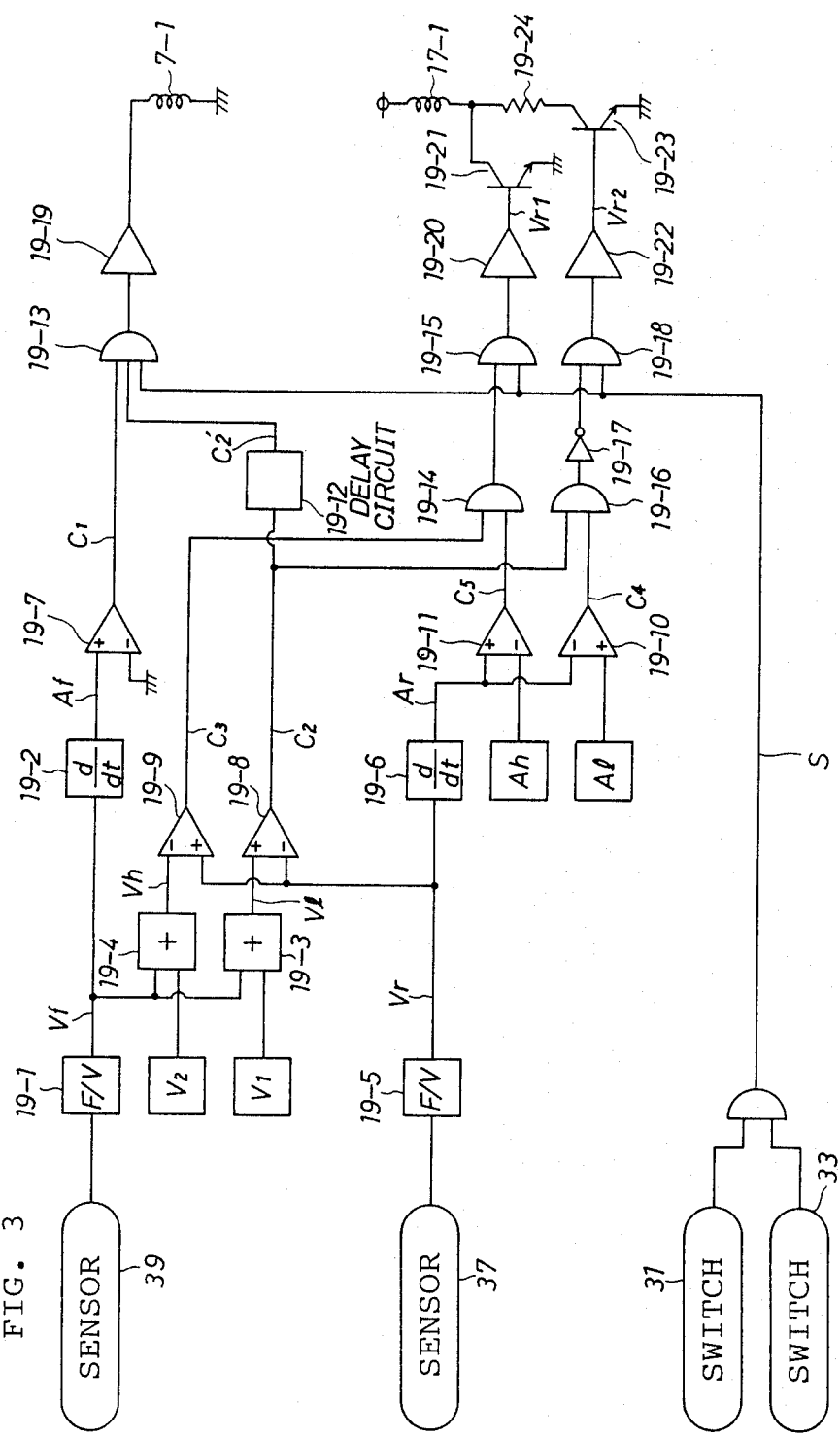
FIG. 3 is a block diagram of an electronic control circuit according to the present invention.

Referring to FIG. 3, the electronic control circuit 19 will be described.

A signal from the idler wheel speed sensor 39 is converted into a signal Vf corresponding to the idler wheel speed via a frequency /speed converter circuit, i.e., F/V circuit 19-1. The signal Vf is further converted into a signal Af corresponding to the acceleration of the idler wheel via a differentiator 19-2. The signal Vf is added to a value of a first reference speed V1 (predetermined value) w by a summing machine 19-3 to be converted into a first slip determination speed V1. The signal Vf is also added to a value of a second reference speed V2 (predetermined value) by another summing machine 19-4 to be converted to a second slip determination speed Vh. The second reference speed V2 is set to be greater than the first reference speed V1. A signal from the driving wheel speed sensor 37, on one hand, is converted into a signal Vr corresponding to the driving wheel speed via another F/V circuit 19-5. The signal Vr is converted into a signal Ar corresponding to an acceleration of the driving wheels 21 via another differentiator 19-6.

The signal Af is input to a non-inverting input terminal of a first comparator 19-7 to which an inverting input terminal is grounded. The signal V1 is input to a noninverting input terminal of a third comparator 19-9, while the signal Vr is input to an inverting input terminal of a second comparator 19-8. The signal Vh is input to an inverting input terminal of the third comparator 19-9, while the signal Vr is input to the non-inverting input terminal thereof. The signal Ar is input to an inverting input terminal of a fourth comparator 19-10 while the first slip determination acceleration A1 ( a minus predetermined value) is input to a non-inverting input terminal thereof. The signal Ar is also input to a non-inverting input terminal of a fifth comparator 19-11, while a second slip determination acceleration Ah (a plus predetermined value) is input to an inverting input terminal thereof.

An output C1 from the first comparator 19-7 and a signal C'2 from a delay circuit 19-12 through which an output C2 from the second comparator 19-8 is processed are input to a first AND gate 19-13. An output C3 from the third comparator 19-9 and an output C5 from the fifth comparator 19-11 are subjected to a logical multiplication via a second AND gate 19-14, having an output applied as an input to a third AND gate 19-15. The output C2 from the second comparator 19-8 and an output C4 from the fourth comparator 19-10 are subjected to a logical multiplication via a fourth AND gate 19-16, which has an output applied as an input to a fifth AND gate 19-18 through a NOT gate 19-17.

A signal S, generated with respect to each signal from a hydraulic switch 33 and a pedal switch 31, is input to the first AND gate 19-13, the third AND gate 19-15, and the fifth AND gate 19-18, respectively. In case that an operator of a vehicle does not operate the brake pedal, i.e., the conditions of both hydraulic switch 33 and the pedal switch 31 are OFF, the signal S is to yield a logic "1".

An output terminal of the first AND gate 19-13 is connected to a solenoid 7-1 of the two-position selector valve 7. An output terminal of the third AND gate 19-15 is connected to a base of a first transistor 19-21 via an amplifier 19-20. An output terminal of the fifth AND gate 19-18 is connected to a base of a second transistor 19-23 via an amplified to a solenoid 17-1 of the three-position solenoid valve 17. In the second transistor 19-23, a collector is connected to the solenoid 17-1 via a resistor 19-24.

Referring to FIG. 4, an example of the operation executed by the electronic control circuit 19 will be described.

With both the pedal switch 31 and the hydraulic switch 33 in the OFF state, in case a driving wheel acceleration Ar increases to be more than the second slip determination acceleration Ah, and a driving wheel speed Vr further increases to be more than the second slip determination speed Vh, the first transistor 19-21 is turned ON and the threeposition solenoid valve 17 is adjusted to the position where the brake fluid is fed to the chamber 9-2 of the input port 9-1 in the valve 9. In case the acceleration Ar decreases to be less than Ah, the adjusted position of the solenoid valve 17 is released, and instead, it is set to the position where the brake fluid within the chamber 9-2 of the input port 9-1 is maintained. In case the driving wheel speed Vr decreases to be less than the first slip determination speed V1, the solenoid valve 17 is adjusted to a position where the brake fluid within the chamber 9-2 is drained into the reservoir 13-1. When the acceleration Ar reaches to be more than A1, the valve 17 is further adjusted to a position where the brake fluid in the chamber 9-2 is maintained.

In the aforementioned first embodiment, the three-position solenoid valve 17 is adjusted in accordance with the speed and acceleration of the driving wheel. In the second embodiment utilizing a microcomputer, the valve 17 is adjusted in accordance with a minimum determination value Vs1 and a maximum determination value Vs2, respectively, both of which are derived from the following equations:

$$Vs1 = K1 \times Vf + g1 \qquad (1)$$

$$Vs2 = K2 \times Vf + g2 \qquad (2)$$

where K1 and K2 are predetermined coefficients, and g1 and g2 are predetermined constant values, respectively.

Figure 5:
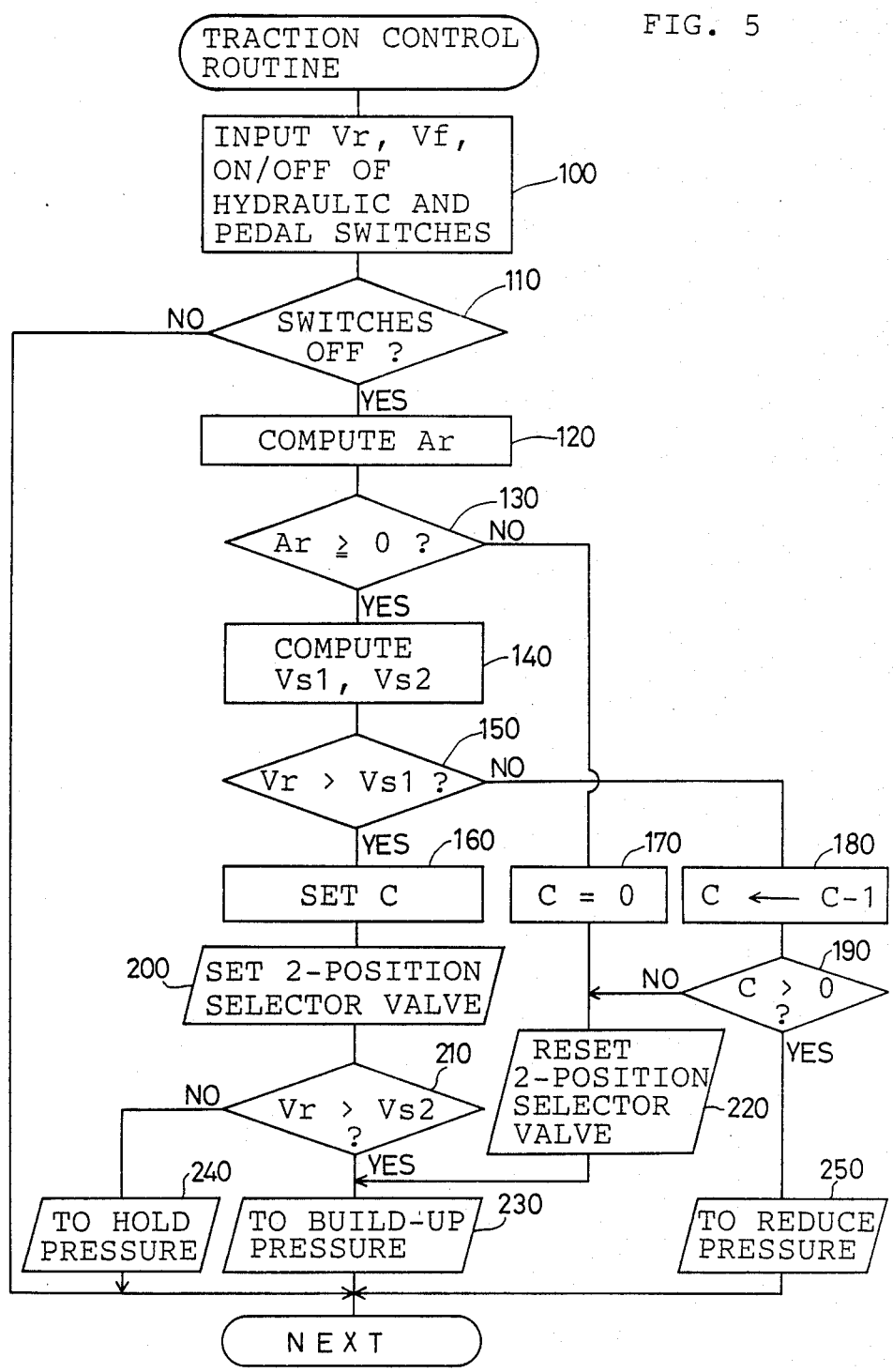
FIG. 5 is a flow chart showing the process steps executed in a second preferred embodiment of the invention.

A flow chart in FIG. 5 represents the program process steps of the traction control executed by the microcomputer according to the second embodiment.

A program starts at step 100 where a driving wheel speed Vr, an idler wheel speed Vf, and ON/OFF conditions of the hydraulic switch 33 and the pedal switch 31 are input. The program proceeds to step 110 where a determination is made whether both switches are in the OFF state. If the determination is NO, i.e., at least either the hydraulic or the pedal switch is ON, the program terminates. If the determination is YES, i.e., both switches are OFF, the program proceeds to step 120 where a driving wheel acceleration Ar is computed in accordance with changes in the driving wheel speed Vr which is input at the step 100. At step 130, it is determined whether the computed acceleration Ar is more than zero. If the determination is YES, the program proceeds to step 140 where both maximum and minimum determination values Vs1 and Vs2 are computed in accordance with the aforementioned equations (1) and (2). The program then proceeds to step 150 where it is determined whether the driving wheel speed Vr exceeds the minimum determination value Vs1. If the determination is YES, i.e., the wheel speed Vr exceeds the minimum determination value Vs1, the program proceeds to step 160 where a counter C is set with predetermined value. The program further proceeds to step 200 where the two-position selector solenoid valve is set to the cut position. At step 210, it is determined whether the driving wheel speed Vr further exceeds the maximum determination value Vs2. If the determination is YES, the program proceeds to step 230 where it is determined whether or not the three-position solenoid valve 17 is adjusted into a phase of pressure build-up. If the determination is NO, i.e., Vr is less than Vs2, the solenoid valve 17 is adjusted into a pressure holding phase.

Back to the step 150, if the determination is NO, i.e., Vr is less than Vs1, the program proceeds to step 180 where the counter C is updated by subtracting 1 from the original value. Then, at step 190, it is determined whether the counter C exceeds zero. If the determination is YES, the program proceeds to step 250 where the solenoid valve 250 is adjusted into the pressure reducing phase.

In case that the counter C at the step 160 is decreased at the step 180 to be less than zero, the determination at the step 190, therefore, is NO. Then, the program proceeds to step 220 and 230 where predetermined routines are executed as described above.

In case the acceleration Ar becomes less than zero in the course of the execution, the determination at the step 130 results in NO. The program then proceeds to step 170 where the counter C is set to zero. At step 220, the two-position selector valve 7 is reset to a normal position, an the three-position solenoid valve 17 is adjusted into the pressure build-up phase.

In the second embodiment, the traction control routine is repeated as described above.

According to the aforementioned embodiments, both anti-skid and the traction controls are executed through the respective control valves 5 and 9, individually. On starting the traction control, the operations of build-up, reducing, and holding pressures through the valve 9 are controlled so as not to influence the function of the master cylinder 1, whereby the above controls do not interfere with each other. The reducing pressure under the anti-skid controlling, therefore, is performed without consideration of the capacity of the reservoir.

Obviously, numerous modifications and variations of the present invention are possible in light of the above teachings. It is therefore to be understood that within the scope of the appended claims, the invention may be practiced otherwise than as specifically described herein.

What is claimed as new and designed to be secured by Letters Patent of the United States is:

1. A wheel slip control system in a vehicle having a brake master cylinder, at least one wheel cylinder and a hydraulic circuit connected between said master cylinder and said at least one wheel cylinder, said system comprising:
 a first capacity control valve positioned in said hydraulic circuit;
 a second capacity control valve having a spool and defining a reservoir, the capacity of said reservoir being determined by said spool, said reservoir forming a portion of said hydraulic circuit;
 hydraulic pressure source means for generating hydraulic pressure to operate said first and second capacity control valves;
 first solenoid valve means provided between said hydraulic pressure source means and said first capacity control valve for selectively varying the hydraulic fluid pressure in said first capacity control valve;
 second solenoid valve means provided between said hydraulic pressure source means and said second capacity control valve for moving said spool and varying the capacity of said reservoir;
 selector valve means provided in said hydraulic circuit between said first and second capacity control valves for selectively fluidically isolating said first capacity control valve from said reservoir; and
 control means for determining a start of traction control and for controlling said second solenoid valve to move said spool and to control said selector valve to fluidically isolate said first capacity control valve from said reservoir upon a determination for starting traction control, whereby the capacity of said reservoir is not varied during anti-skid control.

2. The wheel slip control system according to claim 1 wherein said electronic control means comprises:
    means for preventing interference between said traction control and said anti-skid control.

3. The wheel slip control system according to claim 1 wherein said electronic control means comprises:
    means for preventing a hydraulic action of said second capacity control valve over said master cylinder.

4. The wheel slip control system according to claim 1, wherein said second solenoid valve and said second capacity control valve perform said traction control.

5. The wheel slip control system according to claim 1, wherein said control means further comprises:
    means for changing said selector valve to an isolating position upon a start of traction control no later than an actuation of said second solenoid valve.

* * * * *